(12) United States Patent
Sankaranarayanan et al.

(10) Patent No.: US 9,247,428 B2
(45) Date of Patent: Jan. 26, 2016

(54) CALL HANDLING BASED ON USER PROFILE IDENTIFICATION

(71) Applicant: Intel Corporation, Santa Clara, CA (US)

(72) Inventors: Ananth Sankaranarayanan, Portland, OR (US); Mubashir A. Mian, Santa Clara, CA (US); Jim S. Baca, Corrales, NM (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 13/976,034

(22) PCT Filed: Mar. 14, 2013

(86) PCT No.: PCT/US2013/031364
§ 371 (c)(1),
(2) Date: Oct. 7, 2013

(87) PCT Pub. No.: WO2014/142878
PCT Pub. Date: Sep. 18, 2014

(65) Prior Publication Data
US 2014/0273962 A1 Sep. 18, 2014

(51) Int. Cl.
*H04M 3/42* (2006.01)
*H04W 12/06* (2009.01)
*H04W 4/16* (2009.01)
*H04L 29/08* (2006.01)
*H04M 1/57* (2006.01)
*H04M 1/725* (2006.01)

(52) U.S. Cl.
CPC ............. *H04W 12/06* (2013.01); *H04L 67/306* (2013.01); *H04M 1/57* (2013.01); *H04W 4/16* (2013.01); *H04M 1/575* (2013.01); *H04M 1/72563* (2013.01)

(58) Field of Classification Search
USPC .............. 455/405, 410–414.1, 415, 418, 566, 455/567
See application file for complete search history.

(56) References Cited

U.S. PATENT DOCUMENTS

| 8,793,490 B1 * | 7/2014 | Szwalbenest | H04L 69/14 380/33 |
| 2002/0120860 A1 * | 8/2002 | Ferguson | 713/200 |

(Continued)

OTHER PUBLICATIONS

International Search Report and Written Opinion received for PCT Application No. PCT/US2013/031364, mailed on Nov. 29, 2013, 15 pages.

(Continued)

*Primary Examiner* — Dai A Phuong
(74) *Attorney, Agent, or Firm* — Barnes & Thornburg LLP

(57) ABSTRACT

Technologies for handling a call based on user identification include determining a personal profile identification for a user of a communal mobile communication device and initiating a call to a personal communication device using a phone number of the personal communication device and the personal profile identification. The personal communication device may apply a call treatment to the incoming call based on the personal profile identification. Additionally, the personal communication device may originate a call to a call recipient of the communal mobile communication device using a personal profile identification to identify the call recipient. The communal mobile communication device may apply a call treatment to the incoming call based on the personal profile identification.

25 Claims, 8 Drawing Sheets

(56) References Cited

U.S. PATENT DOCUMENTS

| | | | |
|---|---|---|---|
| 2004/0208305 A1 | 10/2004 | Gross et al. | |
| 2005/0041783 A1 | 2/2005 | Timmins et al. | |
| 2007/0055995 A1* | 3/2007 | Jiang | H04W 4/12 725/62 |
| 2008/0046735 A1 | 2/2008 | Nedeltchev et al. | |
| 2009/0061872 A1* | 3/2009 | Hicks | H04M 15/00 455/436 |
| 2009/0318113 A1* | 12/2009 | Waller | H04M 15/00 455/407 |
| 2011/0207448 A1* | 8/2011 | Chen et al. | 455/418 |
| 2012/0072934 A1 | 3/2012 | Katsikas et al. | |
| 2013/0137376 A1* | 5/2013 | Fitzgerald et al. | 455/41.3 |
| 2014/0003590 A1* | 1/2014 | Dave et al. | 379/93.02 |

OTHER PUBLICATIONS

"Caller ID," Wikipedia, The Free Encyclopedia, retrieved from: <http://en.wikipedia.org/w/index.php?title=Caller_ID&oldid=511602822>, edited Sep. 9, 2012, 13 pages.

"Distinctive ring," Wikipedia, The Free Encyclopedia, retrieved from: <http://en.wikipedia.org/w/index.php?title=Distinctive_ring&oldid=485542092>, edited Apr. 4, 2012, 1 page.

* cited by examiner

CALL HANDLING BASED ON USER PROFILE IDENTIFICATION

BACKGROUND

Mobile communication devices, such as cellular phones, are becoming ubiquitous tools for personal communication and, in the case of smartphones, computing. Due to ease of use and accessibility, the use of mobile communication devices continues to rise. In fact, mobile communication devices are becoming so commonplace that some people are replacing the traditional landline telephones with personal mobile communication devices. Doing so, can save the user monthly fees for the landline telephone, as well as improve accessibility of the user by maintaining a single phone number at which to reach the user.

In some situations, especially in developing countries, a single mobile communication device may be used by more than one user. For example, a family may replace their traditional landline (or simply not have access to a traditional landline) with a single "family" mobile communication device. While the use of a "family" mobile communication device provides the family with the ability to receive and originate communications, difficulties can arise in determining the recipient family member for an incoming call without interrogating the caller. Such difficulties are exacerbated if the mobile communication device is being used for an extended family or community (e.g., a village communication device) in which the number of users increases and their familiarity with each other decreases.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
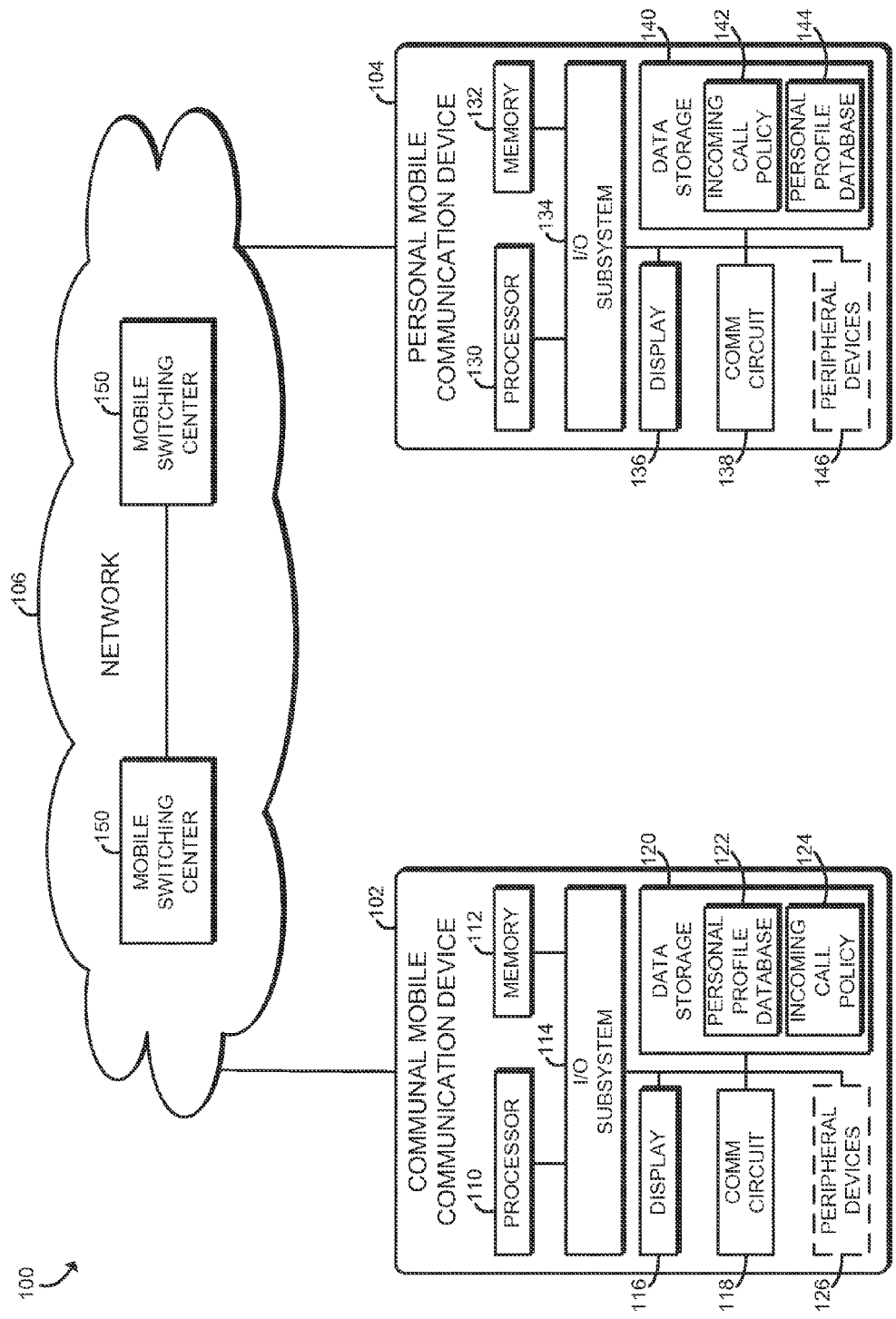
FIG. 1 is a simplified block diagram of at least one embodiment a system for handling incoming and outgoing calls based on personal profile identification.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for handling incoming and outgoing calls based on user profile identification includes a communal mobile communication device 102, a personal mobile communication device 104, and a communication network 106 over which the devices 102, 104 may communicate. The communal mobile communication device 102 is illustratively embodied as a mobile communication device designated for use by multiple users. For example, the communal mobile communication device 102 may be embodied as a family phone used by the members of the family, as a village phone used by various members of a village in a developing country, or as any other type of public or semi-public phone used by members of a particular group (e.g., a business unit, a club, etc.). Alternatively, in some embodiments, the communal mobile communication device 102 may be used primarily by a single person but for different purposes such as for both personal and business uses. Conversely, the personal mobile communication device 104 is illustratively embodied as a personal phone used by a single person or primarily by a single person. However, in some embodiments, the personal mobile communication device 104 may be embodied as a communal phone similar to the communal mobile communication device 102, as a public phone, or as a typical phone or communication device.

In use, as discussed in more detail below, the communal mobile communication device 102 facilitates multiple users by allowing each user to select a personal profile identification, which uniquely identifies each user from the other users of the communal mobile communication device 102. The personal profile identification allows the call recipient of the personal mobile communication device 104 to identify not only that the call originated from the communal mobile communication device 102 as typical but also the identity of the person using the communal mobile communication device 102 to originate the call. That is, the communal mobile communication device 102 may originate calls to the personal mobile communication device 104 (or other communication device) using the personal profile identification. For example, the generated call may use the recipient phone number of the personal mobile communication device 104, the phone number of the communal mobile communication device 102, and the user's call profile identification. Typically, when receiving a call on the personal mobile communication device 104 from a standard communication device, the user of the personal mobile communication device 104 is only able to identify the calling number (i.e., usually the owner or primary user of the calling number). However, because the incoming call includes the personal profile identification, the personal mobile communication device 104 may identify the particular user of the communal mobile communication device 102 and apply call treatments personalized to that user (e.g., a customized ringtone for each different user of the communal mobile communication device).

The use of the personal profile identification to identify the various users of the communal mobile communication device 102 also allows the user of the personal mobile communication device 104 to call a particular user of the communal mobile communication device 102. To do so, the personal mobile communication device 104 originates the call using the call recipient's personal profile identification, which may be locally stored. Upon receiving the call, the communal mobile communication device 102 determines the call recipient based on the personal profile identification included in the incoming call and announces the call using a call treatment, which may be customized for the call recipient (e.g., a picture of call recipient may be displayed on the communal mobile communication device 102).

The communal mobile communication device 102 may be embodied as any type of mobile communication device capable of performing the functions described herein. For example, in some embodiments, the communal mobile communication device 102 may be embodied as a "smart" phone, a cell phone, a tablet computer, a laptop computer, a mobile appliance device, or other mobile computing device capable of communications over the network 106. As shown in FIG. 1, the illustrative communal mobile communication device 102 includes a processor 110, a memory 112, an input/output subsystem 114, a display 116, a communication circuit 118, and a data storage 120. Of course, the communal mobile communication device 102 may include other or additional components, such as those commonly found in a mobile communication device and/or computing devices (e.g., various input/output devices), in other embodiments. Additionally, in some embodiments, one or more of the illustrative components may be incorporated in, or otherwise from a portion of, another component. For example, the memory 112, or portions thereof, may be incorporated in the processor 110 in some embodiments.

The processor 110 may be embodied as any type of processor capable of performing the functions described herein. For example, the processor may be embodied as a single or multi-core processor(s) having one or more processor cores, a digital signal processor, a microcontroller, or other processor or processing/controlling circuit. Similarly, the memory 112 may be embodied as any type of volatile or non-volatile memory or data storage currently known or developed in the future and capable of performing the functions described herein. In operation, the memory 112 may store various data and software used during operation of the communal mobile communication device 102 such as operating systems, applications, programs, libraries, and drivers.

The memory 112 is communicatively coupled to the processor 110 via the I/O subsystem 113, which may be embodied as circuitry and/or components to facilitate input/output operations with the processor 110, the memory 112, and other components of the communal mobile communication device 102. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 110, the memory 112, and other components of the communal mobile communication device 102, on a single integrated circuit chip.

The display 116 of the communal mobile communication device 102 may be embodied as any type of display on which information may be displayed to a user of the communal mobile communication device 102. In some embodiments, for example, the display 116 may be embodied as a touchscreen display and includes a corresponding touchscreen sensor (not shown) to receive tactile input (e.g., a tactile input gesture) and data entry from the user. The display 116 may be embodied as, or otherwise use, any suitable display technology including, for example, a liquid crystal display (LCD), a light emitting diode (LED) display, a cathode ray tube (CRT) display, a plasma display, and/or other display usable in a mobile computing device.

The communication circuit 118 may be embodied as one or more devices and/or circuitry for enabling communications between the communal mobile communication device 102 and the personal mobile communication device 104. The communication circuit 118 may be configured to use any suitable communication protocol to communicate with the personal mobile communication device 104 over the network 106 including, for example, cellular communication protocols, wireless data communication protocols, and/or wired data communication protocols.

The data storage 120 may be embodied as any type of device or devices configured for the short-term or long-term storage of data such as, for example, memory devices and circuits, memory cards, hard disk drives, solid-state drives, or other data storage devices. In the illustrative embodiment, the data storage 120 may store a personal profile database 122 and an incoming call policy database 124. The personal profile database 122 stores the personal profile identifications for each of the authorized or "registered" users of the communal mobile communication device 102. Each personal profile, identification uniquely identifies the associated user from other users of the communal mobile communication device 102 and may be embodied as any type of identifier including, but not limited to, a numerical sequence, an alphanumerical passkey, a password, an e-mail address, and/or other identification data capable of uniquely identifying the associated user. In some embodiments as discussed below, access to each personal profile identification is protected (e.g., via password protection) such that only the associated user can access his/her personal profile identification.

The incoming call policy database 124 stores call treatment data identifying particular call treatments to be applied to an incoming call. The call treatment data is associated with individual personal profile identifications such that an incoming call for a particular user of the communal mobile communication device 102 may receive a customized call treatment (e.g., a customized ringtone) such that the users of the communal mobile communication device 102 are alerted to the intended recipient of the call. In some embodiments, the call treatment data may also be associated with the phone number of the communication device originating the incoming call such that the communal mobile communication device 102 may announce the call based on caller, as well as the intended call recipient. Additionally, in some embodiments, the incoming call policy database 124 is embodied in, or otherwise forms a portion of, the personal profile database 122. That is, the personal profile database 122 and/or the incoming call policy database 124 may be incorporated into a common database. For example, in the illustrative example, each of the personal profile database 122 and/or the incoming call policy database 124 is embodied in, or otherwise included in, a contacts database 208 (see FIG. 2) of the communal mobile communication device 102.

In some embodiments, the communal mobile communication device 102 may further include one or more peripheral devices 126. Such peripheral devices 126 may include any type of peripheral device commonly found in a mobile communication device or computing device as other data storage devices, speakers, a hardware keyboard, input/output devices, peripheral communication devices, and/or other peripheral devices.

Similar to the communal mobile communication device 102, the personal mobile communication device 104 may be embodied as any type of mobile communication device capable of performing the functions described herein. For example, in some embodiments, the personal mobile communication device 104 may be embodied as a "smart" phone, a cell phone, a tablet computer, a laptop computer, a mobile appliance device, or other mobile computing device capable of communications over the network 106. As shown in FIG. 1, the illustrative personal mobile communication device 104 includes a processor 130, a memory 132, an input/output subsystem 134, a display 136, a communication circuit 138, and a data storage 140. Of course, the personal mobile communication device 104 may include other or additional components, such as those commonly found in a mobile communication device and/or computing devices (e.g., various input/output devices), in other embodiments.

The components of the personal mobile communication device 104 may be similar to the corresponding components of the communal mobile communication device 102. As such, the description of those components of the communal mobile communication device 102 is equally applicable to the corresponding components of the personal mobile communication device 104 and is not repeated herein for clarify of the description. For example, the data storage 140 of the personal mobile communication device 104 may be similar to the data storage 120 of the communal mobile communication device 102 and may be embodied as any type of device or devices configured for the short-term or long-term storage of data such as, for example, memory devices and circuits, memory cards, hard disk drives, solid-state drives, or other data storage devices. In the illustrative embodiment, the data storage 140 may store an incoming call policy database 142 and a personal profile database 144. Similar to the incoming call policy 124 of the communal mobile communication device 102, the incoming call policy 142 of the personal mobile communication device 104 stores call treatment data identifying particular call treatments to be applied to an incoming call based on the personal profile identification included in the incoming call. That is, the call treatment data is associated with individual personal profile identifications such that the personal mobile communication device 104 may announce the particular user of the communal mobile communication device 102 as the caller. For example, the personal mobile communication device 104 may have a ringtone assigned to one particular user (e.g., a son) of the communal mobile communication device 102 and a different ringtone assigned to a different particular user (e.g., a daughter). In this way, the user of the personal mobile communication device 104 is made aware of the identity of the caller even though the same communal mobile communication device 102 is used by both users.

The personal profile database 144 of the personal mobile communication device 104 is similar to the personal profile database 122 of the communal mobile communication device 102 and stores the personal profile identifications for various users of the communal mobile communication device 102. When originating a call to a particular user of the communal mobile communication device 102, the personal mobile communication device 104 may retrieve the personal profile identification of the call recipient. The personal mobile communication device 104 originates the call using the personal profile identification to allow the communal mobile communication device 102 to announce the incoming call for the particular user as discussed above. In some embodiments, the incoming call policy 142 and or the personal profile database 144 may be incorporated in to a common database. For example, in the illustrative example, each of the incoming call policy database 142 and the personal profile database 144 is embodied in, or otherwise included in, a contacts database 308 (see FIG. 3) of the personal mobile communication device 104.

Figure 2:
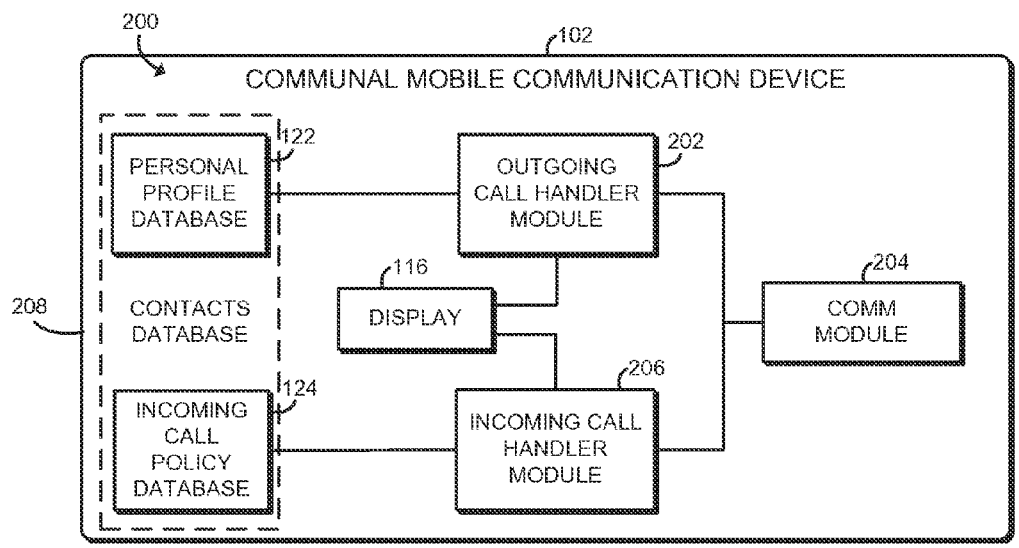
FIG. 2 is a simplified block diagram of at least one embodiment of an environment of a communal mobile communication device of the system of FIG. 1.

Referring now to FIG. 2, in the illustrative embodiment, the communal mobile communication device 102 establishes an environment 200 during operation. The illustrative environment 200 includes an outgoing call handler module 202, a communication module 204, an incoming call handler module 206, the personal profile database 122, and the incoming call policy database 124. The various modules of the environment 200 may each be embodied as software, firmware, hardware, or a combination thereof. The outgoing call handler module 202 manages the outgoing calls originating from the communal mobile communication device 102 via the communication module 204. For example, the outgoing call handler module 202 may present a user interface (e.g., a graphical use interface) on the display 116. A user of the communal mobile communication device 102 may select the desired user account (i.e., select the identity of the caller) from the user interface (or may simply enter a passcode to automatically select the desired user account). As discussed above, the selection of a particular caller identity on the communal mobile communication device 102 may be protected via a password, passkey, or other security measure. If the user is properly authenticated, the outgoing call handler module 202 retrieves the personal profile identification associated with the selected user from the personal profile database 122. The communal mobile communication device 102 subsequently originates the outgoing call to the personal mobile communication device 104 (or other desired recipient communication device) using the personal profile identification. Because the outgoing call includes the personal profile identification, the personal mobile communication device 104 (or other recipient communication device) is able to announce the particular caller to the user of the personal mobile communication device 104.

The incoming call handler module 206 manages the handling of incoming calls to the communal mobile communication device 102 received via the communication module 204. For example, the incoming call handler module 206 monitors for incoming calls that include a personal profile identification. If the incoming call includes a personal profile identification, the incoming call handler module 206 retrieves call treatment data from the incoming call policy database 124 based on the personal profile identification. The incoming call handler module 206 subsequently announces the incoming call using the retrieved call treatment data (e.g., by playing particular ringtone or displaying a particular image on the display 116).

Figure 3:
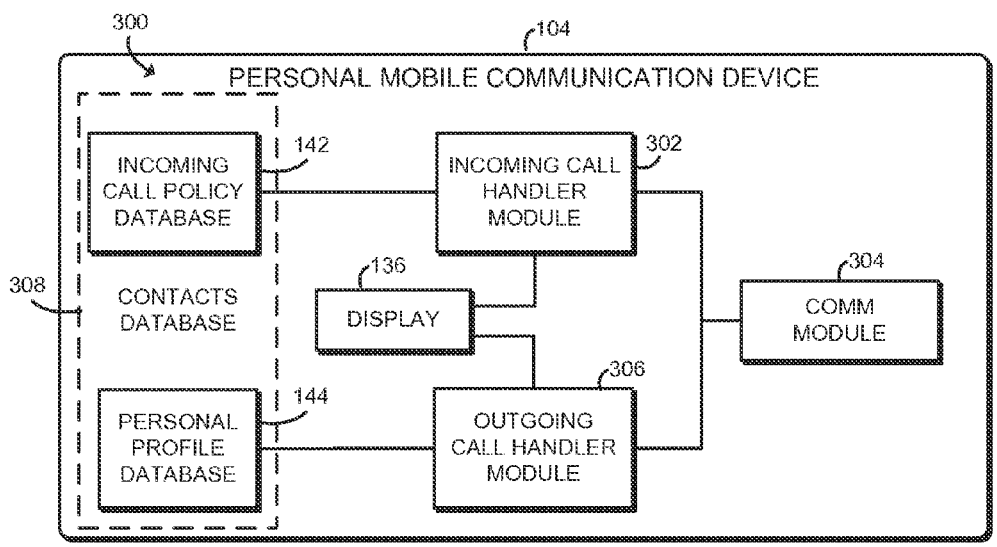
FIG. 3 is a simplified block diagram of at least one embodiment of an environment of a personal mobile communication device of the system of FIG. 1.

Referring now to FIG. 3, in the illustrative embodiment, the personal mobile communication device 104 establishes an environment 300 during operation. The illustrative environment 300 includes an incoming call handler module 302, a communication module 304, an outgoing call handler module 306, the incoming call policy database 142, and the personal profile database 122, and the incoming call policy database 124. The various modules of the environment 300 may each be embodied as software, firmware, hardware, or a combination thereof. The incoming call handler module 302 handles incoming calls received on the personal mobile communication device 104 via the communication module 304. For example, similar to the incoming call handler module 206, the incoming call handler module 302 determines whether the incoming call includes a personal profile identification. If so, the incoming call handler module 304 retrieves call treatment data from the incoming call policy database 142 based on the personal profile identification and subsequently announces the incoming call to the user of the personal mobile communication device 104 using the call treatment data (e.g., by playing a particular ringtone or displaying a particular image on the display 136).

The outgoing call handler module 306 manages the origination of calls from the personal mobile communication device 104. In embodiments in which the user of the personal mobile communication device 104 desires to call a particular user of the communal mobile communication device 102, the outgoing call handler module 306 may retrieve the personal profile identification associated with the desired call recipient from the personal profile database 144. In some embodiments, the personal profile database 144 is incorporated in, or otherwise associated with, a contacts database 308 of the personal mobile communication device 104. In such embodiments, the user of the personal mobile communication device 104 may simply select the call recipient from the contacts database 308. In response, the outgoing call handler module 306 retrieves the associated personal profile identification. Regardless, the outgoing call handler module 306 originates the call to the communal mobile communication device 102 using the retrieved personal profile identification. Because the outgoing call includes the personal profile identification of the desired call recipient, the communal mobile communication device 102 is able to announce the particular call recipient (e.g., by playing a particular ringtone).

Figure 4:
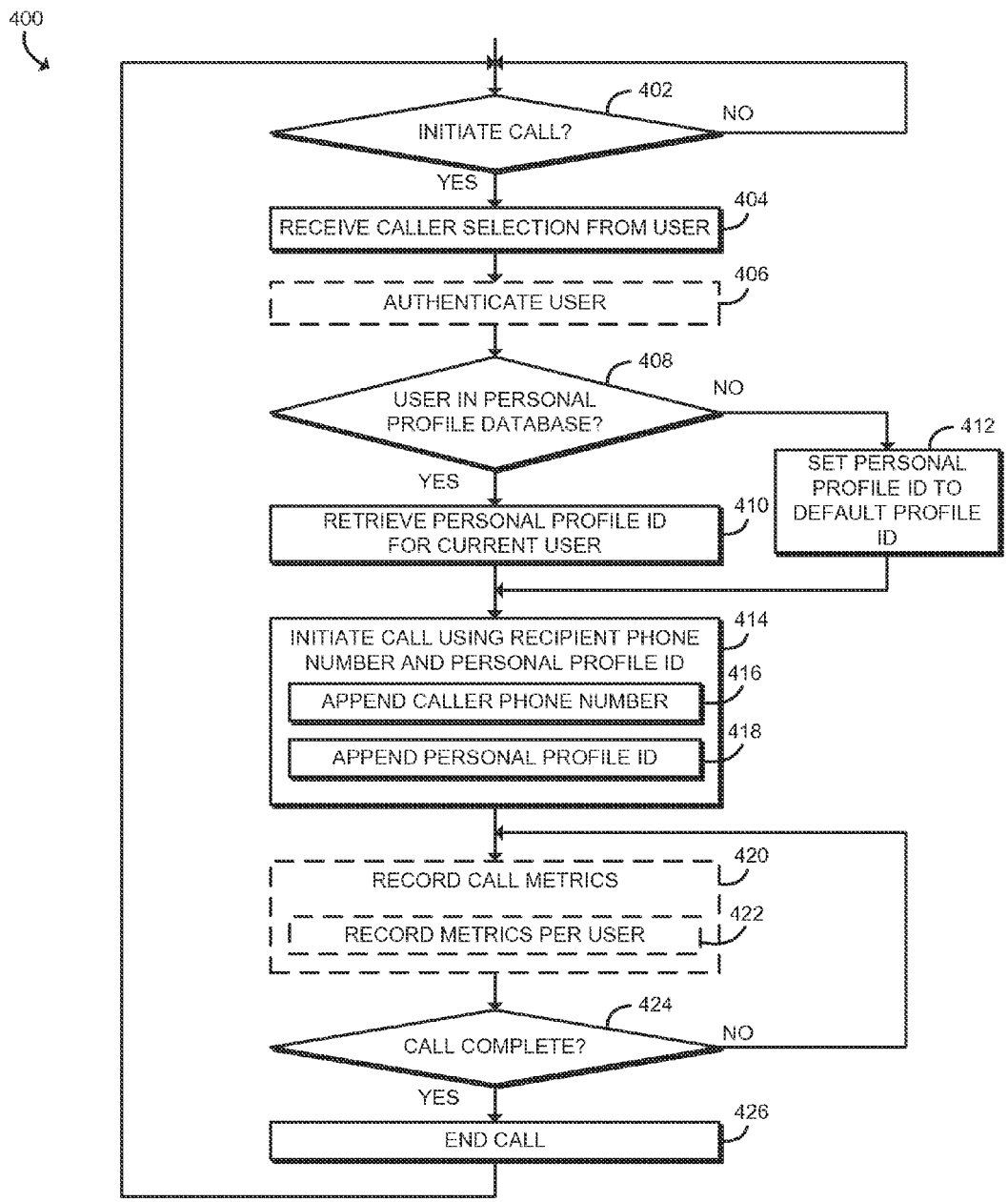
FIG. 4 is a simplified flow diagram of at least one embodiment of a method for initiating a call using a personal profile identification that may be executed by the communal mobile communication device of FIG. 2.

Referring now to FIG. 4, in use, the communal mobile communication device 102 may execute a method 400 for initiating a call using a personal profile identification. The method 400 begins with block 402 in which the communal mobile communication device 102 determines whether the user desires to initiate a call. For example, the user may select a "call" button from a graphical user interface displayed on the display 116 of the communal mobile communication device 102 or the user may simply enter the call recipient's telephone number in block 402. If the communal mobile communication device 102 determines the user desires to make a call, the method 400 advances to block 404 in which the user may select the caller identity. For example, in some embodiments, the communal mobile communication device 102 may present a selection menu of authorized users by name, picture, or other identification. The user may select the caller identity to be used. As discussed above, in some embodiments, the communal mobile communication device 102 may authenticate that the user is authorized to use the selected caller identity in block 406. For example, in response to a user selecting one of the caller identities from a list displayed on the display 116, the communal mobile communication device 102 may prompt the user for an associated password, passkey, or other verification mechanism. In this way, the use of personal profile identifications may be protected.

If the user is successfully authenticated in block 406 (or if no authentication is used), the method 400 advances to block 408 in which the communal mobile communication device 102 determines whether a personal profile identification for the selected user is available in the personal profile database 122. That is, the communal mobile communication device 102 determines whether the user has previously set-up or registered a personal profile identification. If so, the communal mobile communication device 102 retrieves the personal profile identification associated with the selected call identity (i.e., associated with the user) in block 410. However, if no personal profile identification is available, the communal mobile communication device 102 assigns a default personal profile identification in block 412. The default personal profile identification may be embodied as any type of identification and may, in some embodiments, identity only that the call is originating from the communal mobile communication device 102. Alternatively, in some embodiments, the default personal profile identification may be embodied as a null set (i.e., no personal profile identification is assigned). In some embodiments, the user of the communal mobile communication device 102 may enter a personal profile identification at the time of the call if, for example, the personal profile identification is not stored on the communal mobile communication device 102.

In block 414, the communal mobile communication device 102 originates the outgoing call using the phone number of the recipient communication device (e.g. the personal mobile communication device 104) and the personal profile identification retrieved in block 410. The phone number of the recipient communication device may be entered directly by the user of the communal mobile communication device 102 or may be supplied by selection of the call recipient from the contacts database 208 of the communal mobile communication device 102. Regardless, in block 416, the phone number of the communal mobile communication device 102 is appended to the phone number of the recipient communication device (e.g., the personal mobile communication device 104) and the personal profile identification is append to the phone numbers of the recipient communication device and the communal mobile communication device 102 in block 418. As discussed above, the personal profile identification may be embodied as any type of identifier that uniquely identified the associated user from other users of the communal mobile communication device including, for example, a numerical sequence, an alphanumerical passkey, a password, an e-mail address, and/or other identification data capable of uniquely identifying the associated user. The particular mechanism used to append the personal profile identification to the outgoing phone numbers may depend on the implementation and type of network 106. For example, in some embodiments, the mobile switching centers 150 of the network 106 may be modified to handle calls having longer origination and/or destination numbers to support the use of the personal profile identifications.

In some embodiments, in block 420, the communal mobile communication device 102 may record one or more call metrics of the current call. Such call metrics may be embodied as any type of metric related to the current call such as minute usage, call history, call logs, and so forth. In some embodiments, the communal mobile communication device 102 records the metrics for each individual user. By recording the call metrics on a per-user basis, the individual users may monitor their usage of the communal mobile communication device 102. Additionally, each user may be separately billed for their individual usage, even though the communal mobile communication device 102 is used by multiple users.

Subsequently, in block 424, the communal mobile communication device 102 determines whether the call is completed. If not, the method 400 loops back to block 420 to continue recording call metrics (in some embodiments). However, if the call is completed, the call is ended in block 426, and the method 400 loops back to block 402 to await the initiating of a new call.

Figure 5:
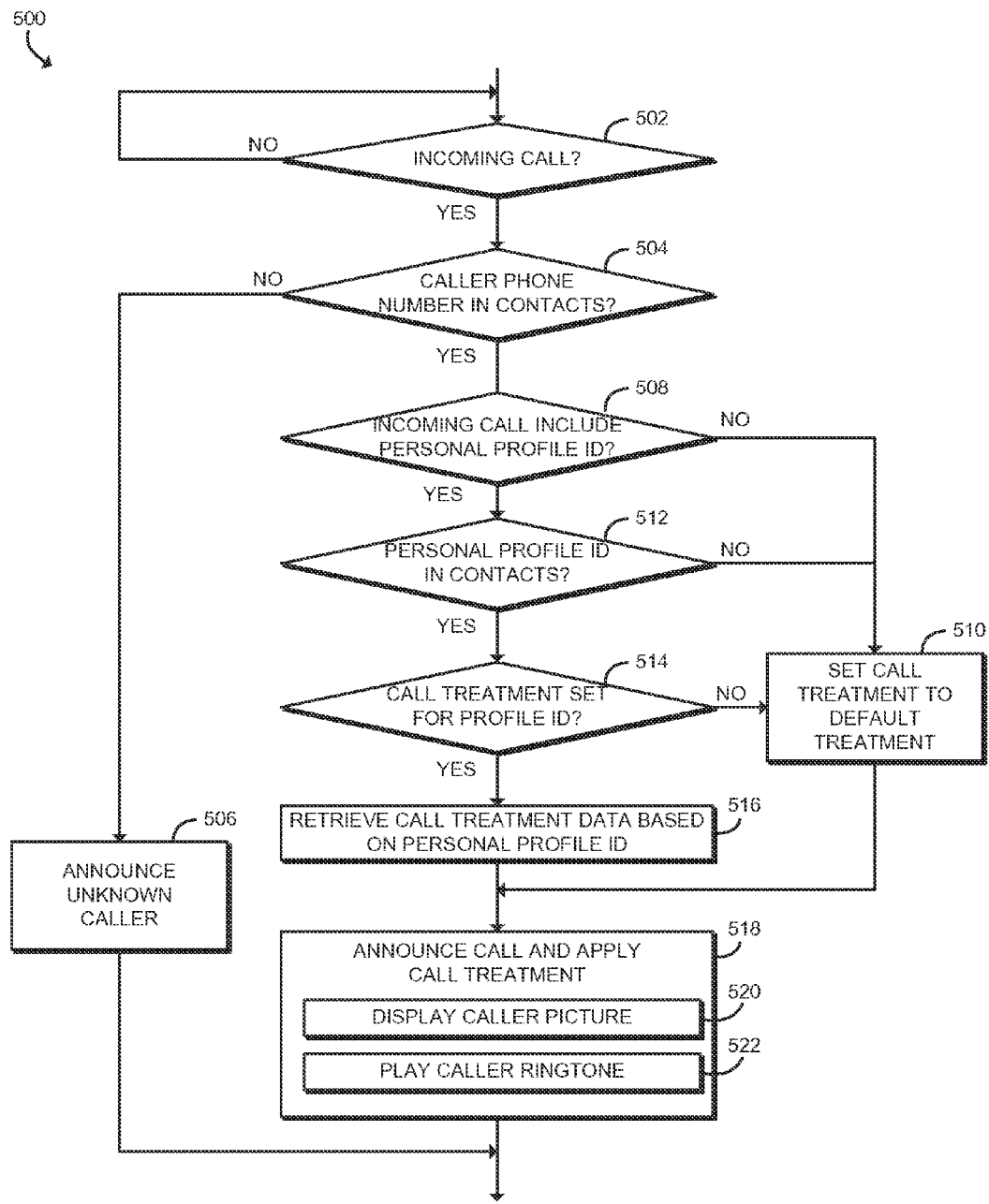
FIG. 5 is a simplified flow diagram of at least one embodiment of a method for receiving a call using a personal profile identification that may be executed by the personal mobile communication device of FIG. 3.

Referring now to FIG. 5, in use, the personal mobile communication device 104 may execute a method 500 for receiving a call using a personal profile identification. The method 500 begins with block 502 in which the personal mobile communication device 104 determines whether an incoming call has been received. If so, in block 504, the personal mobile communication device 104 determines whether the caller's phone number, which is received with the incoming call, is in the contacts database 308 of the personal mobile communication device 104. If not, the method 500 advances to block 506 in which the personal mobile communication device 104 announces the incoming call as an unknown caller (e.g., using a default ringtone and displaying "unknown caller" on the display 136).

If, however, the caller's phone number is in the contacts database 308, the method 500 advances to block 508 in which the personal mobile communication device 104 determines whether the incoming call includes a personal profile identification. If not, the personal mobile communication device 104 sets a default call treatment for the incoming call in block 510 (or sets the call treatment based only on the caller's phone number). If, however, the incoming call does include a personal profile identification, the personal mobile communication device 104 determines whether the personal profile identification is in the personal profile database 144, which may be included in the contacts database 308 as discussed above. If not, the method advances to block 510 in which the personal mobile communication device 104 sets a default call treatment for the incoming call.

If, however, the personal profile identification included in the incoming call is included in the personal profile database 144, the method 500 advances to block 514 in which the personal mobile communication device 104 determines whether a call treatment has been set for the particular personal profile identification. To do so, the personal mobile communication device 104 may compare the personal profile identification to the incoming call policy database 142 to determine whether a call treatment has been set for the particular personal profile identification. If not, the personal mobile communication device 104 sets a default call treatment for the incoming call in Hock 510. If, however, a call treatment has been set for the particular personal profile identification, the method 500 advances to block 516 in which the personal mobile communication device 104 retrieves call treatment data for the incoming call based on the personal profile identification from the incoming call policy database 142. The call treatment data may be embodied as any type of data that defines how the incoming call should be announced or otherwise handled. For example, the call treatment data may include a ringtone that is to be played, a picture or image that is to be displayed, and/or other actions that should be performed to announce, or otherwise handle, the incoming call.

In block 518, the personal mobile communication device 104 announces the call to the user of the personal mobile communication device 104 using the call treatment (if any) previously determined for the call. For example, the personal mobile communication device 104 may display a picture of the caller based on the personal profile identification included in the incoming call in block 520. Additionally or alternatively, the personal mobile communication device 104 may play a particular ringtone associated with the caller based on the personal profile identification included in the incoming call in block 522. Of course, the personal mobile communication device 104 may use other mechanisms and/or data to announce the call in other embodiments including different types of vibrations, display of the caller's phone number, and so forth.

Figure 6:
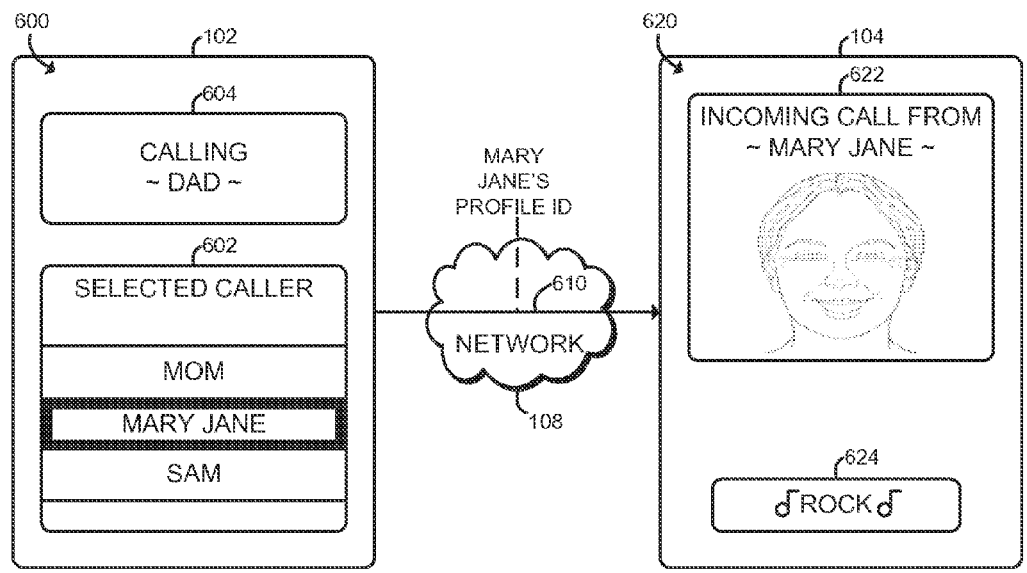
FIGS. 6 and 7 are simplified illustrations of user interfaces that may be displayed on the communal and personal mobile communication devices during the execution of the methods of FIGS. 4 and 5.
Figure 7:
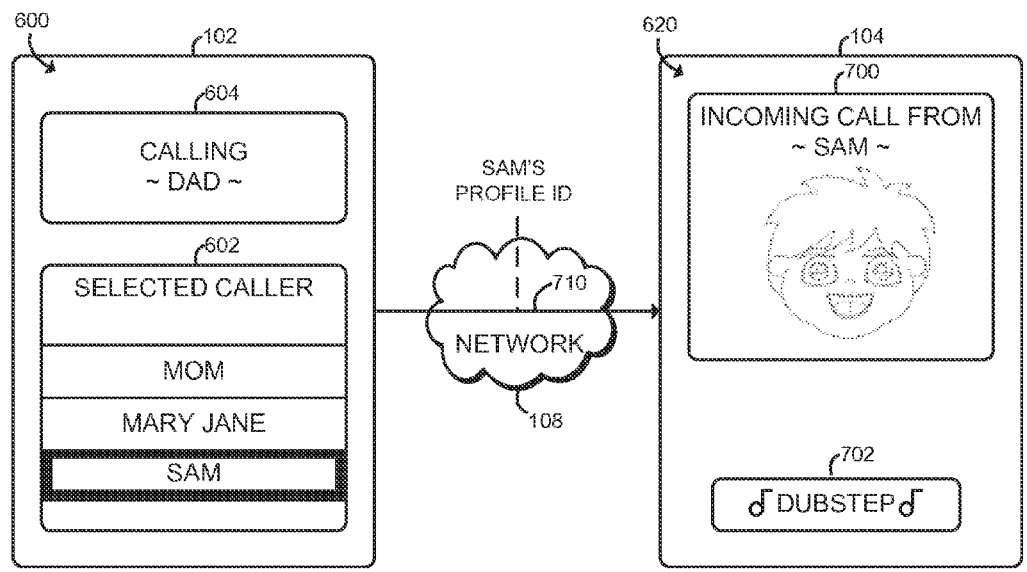

Referring now to FIGS. 6 and 7, illustrative user interfaces displayed on the displays 116, 136 to users of the communal and personal mobile communication devices 102, 104 during execution of the methods 400 and 500 are shown. For example, in the illustrative embodiment of FIG. 6, a user of the communal mobile communication device 102 has selected a caller identity "Mary Jane" from a list 602 of caller identities presented on a user interface 600 of the communal mobile communication device 102 and originated a call 610 to a call recipient 604 ("Dad") of the personal mobile communication device 104. As shown, the call 610 includes the personal profile identification associated with the user "Mary Jane." As such, in response to receiving the call, the personal mobile communication device 104 announces the call using a call treatment based on the received personal profile identification. For example, in the illustrative embodiment, the personal mobile communication device 104 may display an image 622 of the caller "Mary Jane" on a user interface 620 displayed on the display 136. Additionally, the personal mobile communication device 104 announces the call using a ringtone 624 ("Rock") customized for the particular personal profile identification (i.e., for the particular caller "Mary Jane").

Similarly, in the illustrative embodiment of FIG. 7, a different user of the communal mobile communication device 102 has selected a caller identity "Sam" from the list 602 of caller identities presented on the user interface 600 of the communal mobile communication device 102 and originated a call 710 to a call recipient 604 ("Dad") of the personal mobile communication device 104. As shown, the call 710 includes the personal profile identification associated with the user "Sam." As such, in response to receiving the call, the personal mobile communication device 104 announces the call using a call treatment based on the received personal profile identification. For example, in the illustrative embodiment, the personal mobile communication device 104 may display an image 722 of the caller "Sam" on the user interface 620 and announces the call using a ringtone 724 ("Dubstep") customized for the particular personal profile identification (i.e., for the particular caller "Sam"). In this way, the user of the personal mobile communication device 104 is informed of the particular caller using the communal mobile communication device 102.

Figure 8:
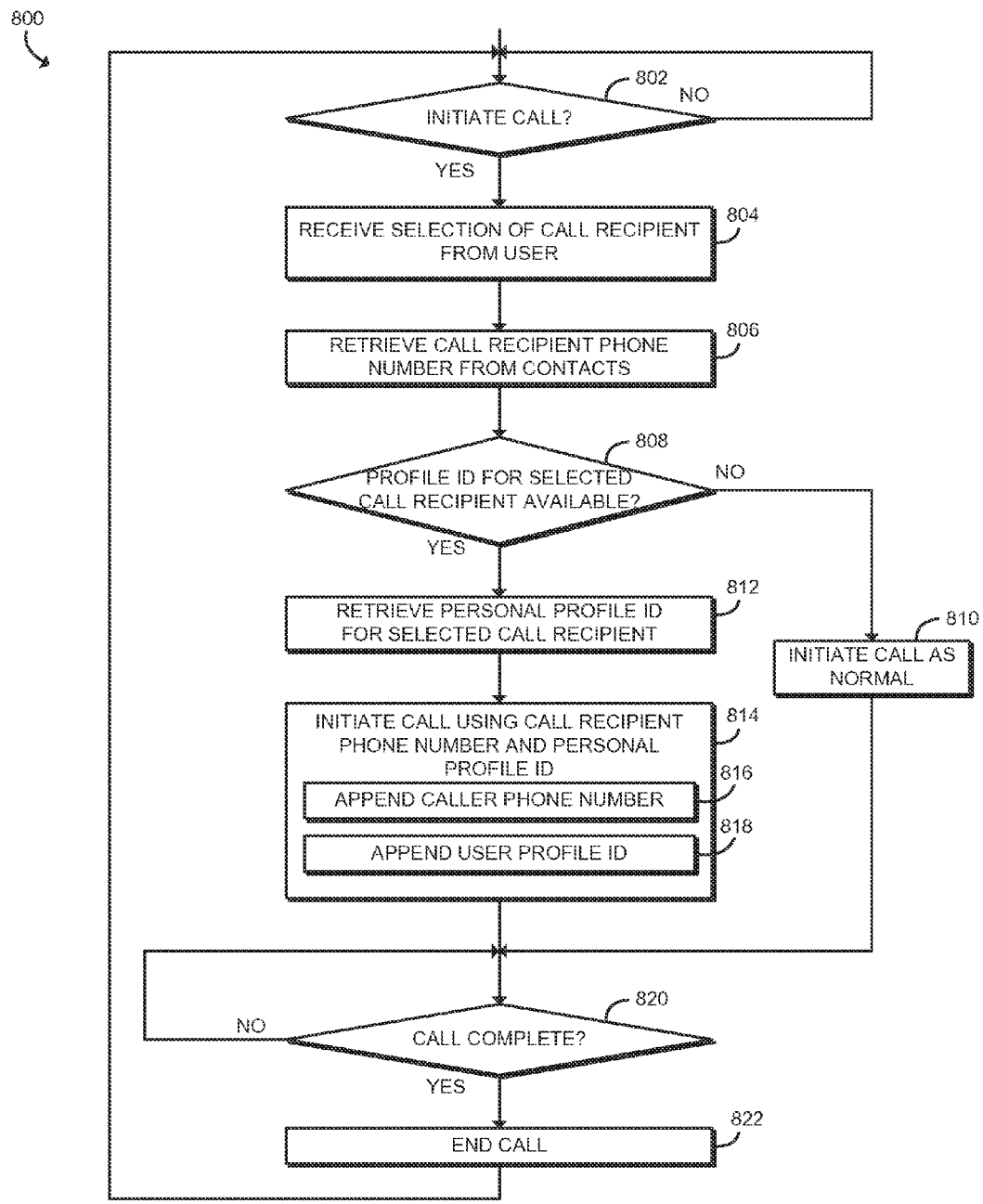
FIG. 8 is a simplified flow diagram of at least one embodiment of a method for initiating a call using a personal profile identification that may be executed by the personal mobile communication device of FIG. 3.

Referring now to FIG. 8, in some embodiments the personal mobile communication device 104 may also originate calls using the personal profile identification of the intended call recipient. That is, a user of the personal mobile communication device 104 may originate a call to one of the users of the communal mobile communication device 102 using the personal profile identification associated with the intended call recipient such that the communal mobile communication device 102 may announce the call for the particular call recipient (i.e., the particular user of the communal mobile communication device 102). To do so, the personal mobile communication device 104 may execute a method 800 for initiating a call using personal profile identification. The method 800 begins with block 802 in which the personal mobile communication device 104 determines whether the user desires to initiate a call. If so, the method 800 advances to block 804 in which the user selects the desired call recipient. For example, in some embodiments, the user may select the desired call recipient from the contacts database 308 or otherwise supply the identification data of the desired call recipient (e.g., the user may supply a partial name to cause the personal mobile communication device 104 to retrieve the intended call recipient from the contacts database 308). Subsequently, in block 806, the personal mobile communication device 104 retrieves the phone number associated with the selected call recipient (e.g., the phone number of the communal mobile communication device 102). In block 808, the personal mobile communication device 104 determines whether a personal profile identification for the selected call recipient is available in the personal profile database 144. If not, the personal mobile communication device 104 initiates the call as normal in block 810.

If, however, a personal profile identification is available of the intended call recipient, the personal mobile communication device 104 retrieves the personal profile identification from the personal profile database 144 in block 812. In block 814, the personal mobile communication device 104 initiates the call using the call recipient's phone number and the personal profile identification retrieved in block 812. For example, in block 816, the phone number of the personal mobile communication device 104 may be appended to the phone number of the recipient communication device (e.g., the communal mobile communication device 102) and the personal profile identification is append to the phone numbers of the recipient communication device and the personal mobile communication device 104 in block 818. As discussed above, the particular mechanism used to append the personal profile identification to the outgoing phone numbers may depend on the implementation and type of network 106.

Subsequently, in block 820, the personal mobile communication device 104 determines whether the call is completed. If not, the method 800 loops back to block 820 to continue checking for the completion of the call. However, if the call is completed, the call is ended in block 822, and the method 800 loops back to block 802 to await the initiating of a new call.

Figure 9:
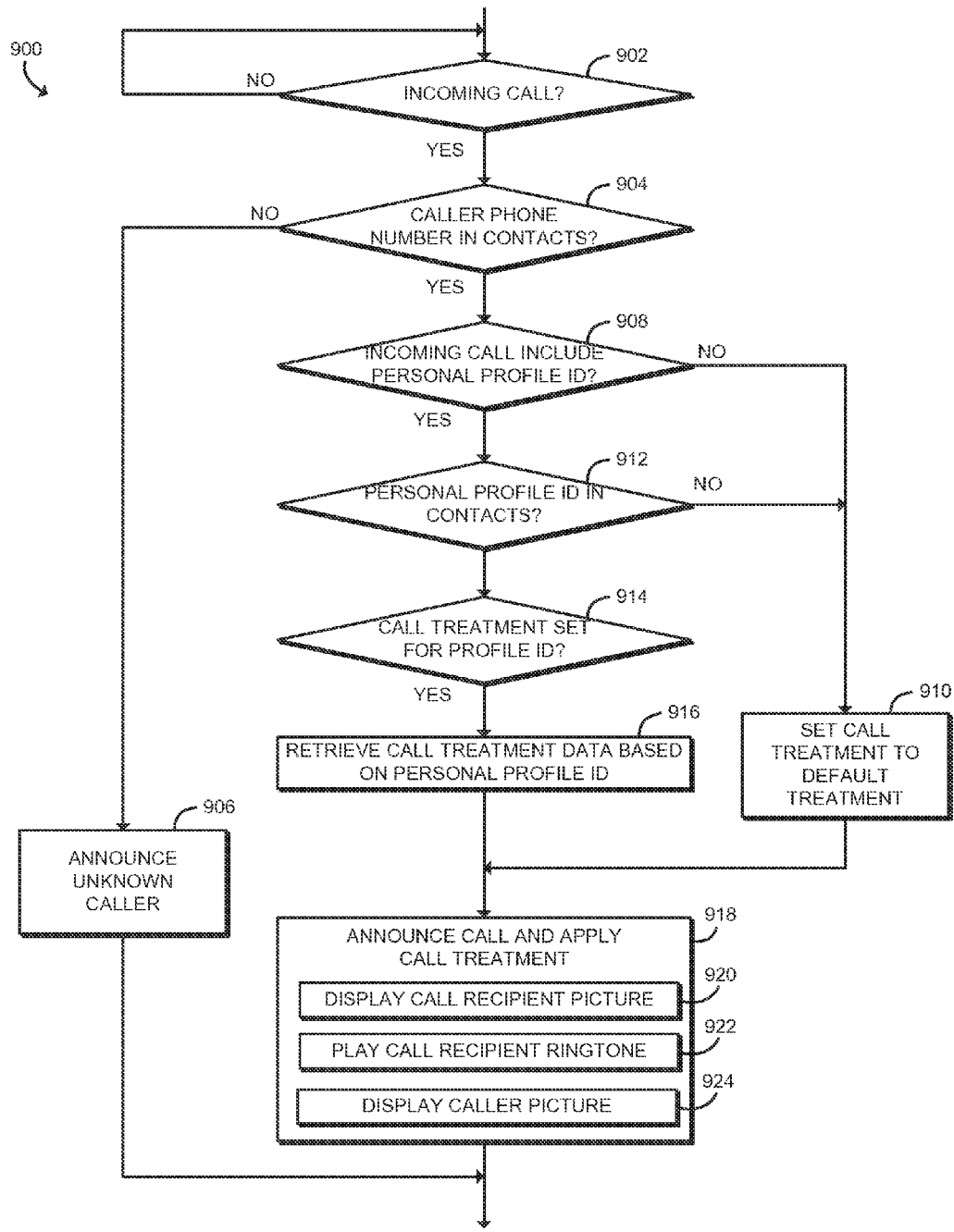
FIG. 9 is a simplified flow diagram of at least one embodiment of a method for receiving a call using a personal profile identification that may be executed by the communal mobile communication device of FIG. 2.

Referring now to FIG. 9, in some embodiments, the communal mobile communication device 102 may also execute a method 900 for handling incoming calls using personal profile identifications. The method 900 begins with block 902 in which the communal mobile communication device 102 determines whether an incoming call has been received. If so, in block 904, the communal mobile communication device 102 determines whether the caller's phone number, which is received with the incoming call, is in the contacts database 208 of the communal mobile communication device 102. If not, the method 900 advances to block 906 in which the communal mobile communication device 102 announces the incoming call as an unknown caller (e.g., using a default ringtone and displaying "unknown caller" on the display 136).

If, however, caller's phone number is in the contacts database 208, the method 900 advances to block 908 in which the communal mobile communication device 102 determines whether the incoming call includes a personal profile identification. If not, the communal mobile communication device 102 sets a default call treatment for the incoming call in block 910 (or sets the call treatment based only on the caller's phone number). If, however, the incoming call does include a personal profile identification, the communal mobile communication device 102 determines whether the personal profile identification is in the personal profile database 122, which may be included in the contacts database 208 as discussed above, in block 912. If not, the method 900 advances to block 910 in which the communal mobile communication device 102 sets a default call treatment for the incoming call.

If, however, the personal profile identification included in the incoming call is included in the personal profile database 122, the method 900 advances to block 914 in which the communal mobile communication device 102 determines whether a call treatment has been set for the particular personal profile identification. To do so, the communal mobile communication device 102 may compare the personal profile identification to the incoming call policy database 124 to determine whether a call treatment has been set for the particular personal profile identification. If not, the communal mobile communication device 102 sets a default call treatment for the incoming call in block 910. If, however, a call treatment has been set for the particular personal profile identification, the method 900 advances to block 916 in which the communal mobile communication device 102 retrieves call treatment data for the incoming call based on the personal profile identification from the incoming call policy database 124.

In block 518, the communal mobile communication device 102 announces the call using the call treatment (if any) previously determined for the incoming call. For example, the communal mobile communication device 102 may display a picture of the call recipient based on the personal profile identification included in the incoming call in block 920. Additionally or alternatively, the communal mobile communication device 102 may play a particular ringtone associated with the call recipient based on the personal profile identification included in the incoming call in block 522. Additionally, in some embodiments, the communal mobile communication device 102 may display a picture or other identification associated with the caller in block 924. Of course, the communal mobile communication device 102 may use other mechanisms and/or data to announce the call in other embodiments including different types of vibrations, display of the caller's phone number, and so forth.

Figure 10:
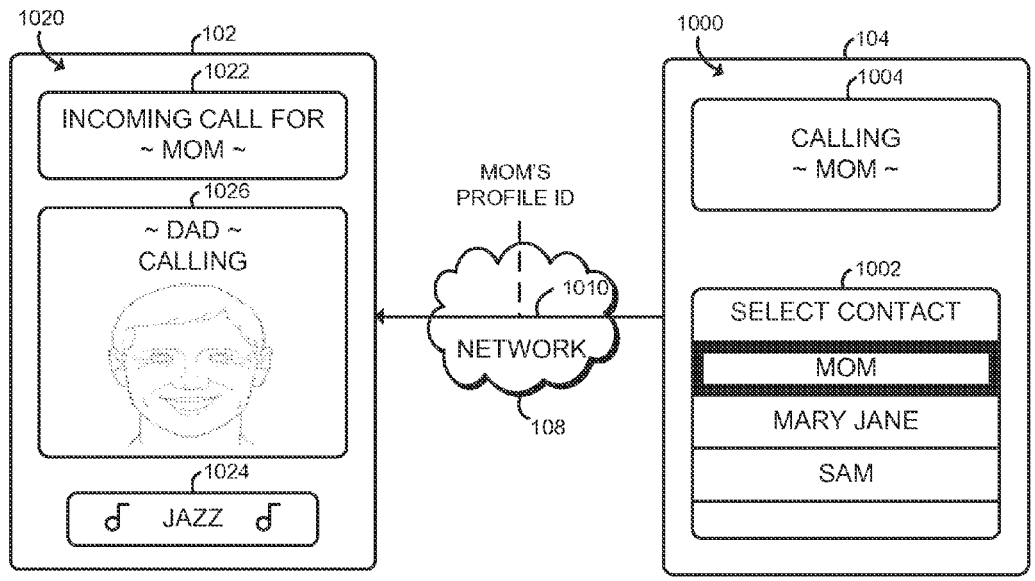
FIGS. 10 and 11 are simplified illustrations of user interfaces that may be displayed on the communal and personal mobile communication devices during the execution of the methods of FIGS. 8 and 9.
Figure 11:
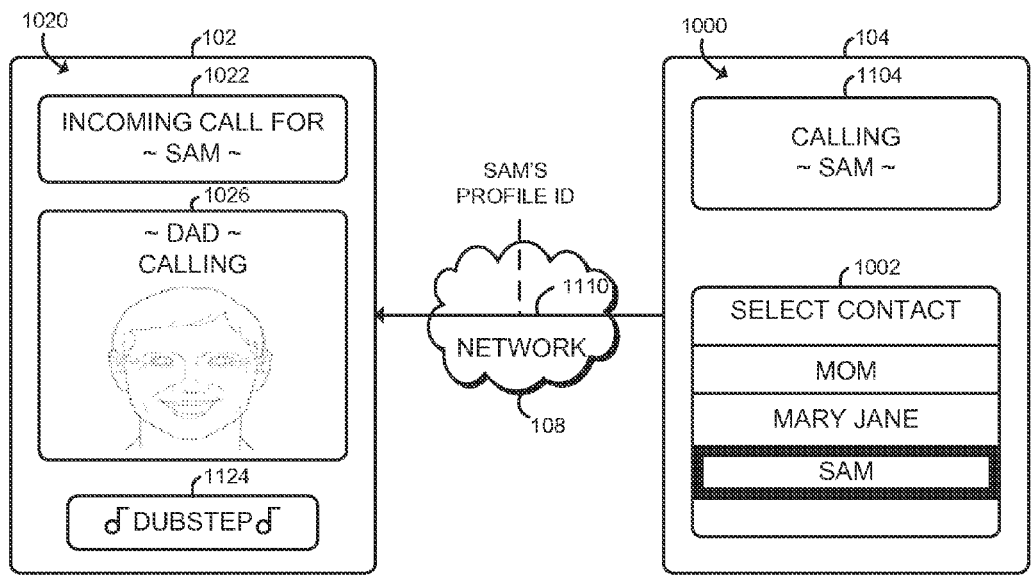

Referring now to FIGS. 10 and 11, illustrative user interfaces displayed on the displays 116, 136 to users of the communal and personal mobile communication devices 102, 104 during execution of the methods 800 and 900 are shown. For example, in the illustrative embodiment of FIG. 10, a user of the personal mobile communication device 104 has selected a caller recipient "Mom" from a contact list 1002 of available call recipients presented on a user interface 1000 of the personal mobile communication device 104 and originated a call 1010 to the call recipient 1004 "Mom") of the communal mobile communication device 102. As shown, the call 1010 includes the personal profile identification associated with the user "Mom" of the communal mobile communication device 102. As such, in response to receiving the call, the communal mobile communication device 102 announces the call using a call treatment based on the received personal profile identification. For example, in the illustrative embodiment, the communal mobile communication device 102 may indicate the call recipient in a display box 1022 on a user interface 1020 and announce the call using a ringtone 1024 ("Jazz") customized for the particular personal profile identification (i.e., for the particular call recipient "Mom"). Additionally, the communal mobile communication device 102 may display an image 1026 of the caller "Dad" on the user interface 1020.

Similarly, in the illustrative embodiment of FIG. 11, the user of the user of the personal mobile communication device 104 has selected a different user of the communal mobile communication device 102 as the call recipient. In the illustrative embodiment, the user of the personal mobile communication device 104 has selected a caller recipient "Sam" from the contact list 1002 and originated a call 1110 to the call recipient 1104 ("Sam") of the communal mobile communication device 102. As shown, the call 1110 includes the personal profile identification associated with the user "Sam" of the communal mobile communication device 102. As such, in response to receiving the call, the communal mobile communication device 102 announces the call using a call treatment based on the received personal profile identification. For example, in the illustrative embodiment, the communal mobile communication device 102 may indicate the call recipient in the display box 1022 and announce the call using a ringtone 1124 ("Dubstep") customized for the particular personal profile identification (i.e., for the particular call recipient "Sam").

EXAMPLES

Illustrative examples of the technologies disclosed herein are provided below. An embodiment of the technologies may include any one or more, and any combination of, the examples described below.

Example 1 includes a communal mobile communication device for handling calls based on user identification, the communal mobile communication device comprising an outgoing call handler module to (i) determine a personal profile identification that identifies a user of the communal mobile communication device from other users, (i) determine a phone number of a personal mobile communication device of a call recipient selected to receive a call from the communal mobile communication device, and (iii) initiate the call to the personal mobile communication device using the phone number and the personal profile identification to identify the user.

Example 2 includes the subject matter of Example 1, and wherein the communal mobile communication device further comprises a display; and a personal profile database having stored therein personal profile identifications for users of the communal mobile communication device, wherein to determine the personal profile identification comprises to present a menu of authorized users of the communal mobile communication device on the display; receive a selection of one of the authorized users from the user; and retrieve a personal profile identification of the selected authorized user from the personal profile database.

Example 3 includes the subject matter of any of Examples 1 and 2, and wherein the communal mobile communication device further comprises a personal profile database having stored therein personal profile identifications for users of the communal mobile communication device, and wherein retrieving the personal profile identification comprises to authenticate the user to access the personal profile identification; and retrieve the personal profile identification from the personal profile database in response to authenticating the user.

Example 4 includes the subject matter of any of Examples 1-3, and further including a display, and wherein to authenticate the user comprises to receive a passkey from the user via a user interface displayed on the display, and authenticate the user based on the received passkey.

Example 5 includes the subject matter of any of Examples 1-4, and wherein the communal bile communication device further comprises a personal profile database having stored therein personal profile identifications for users of the communal mobile communication device, and wherein to determine the personal profile identification comprises to authenticate the user to the communal mobile communication device; and retrieve, in response to authentication of the user, a personal profile identification from the personal profile database based on the authentication of the user.

Example 6 includes the subject matter of any of Examples 1-5, and wherein to authenticate the user comprises to determine whether a personal profile identification for the authenticated user exists in the personal profile database; and set the personal profile identification to a default personal profile identification in response to the determination that the personal profile identification for the user does not exist in the personal profile database.

Example 7 includes the subject matter of any of Examples 1-6, and wherein the personal profile identification comprises a numerical sequence that uniquely identifies the user from other authorized users of the communal mobile communication device.

Example 8 includes the subject matter of any of Examples 1-7, and wherein the personal profile identification comprises an e-mail address that uniquely identifies the user from other authorized users of the communal mobile communication device.

Example 9 includes the subject matter of any of Examples 1-8, and wherein the personal profile identification comprises a passkey that uniquely identifies the user from other authorized users of the communal mobile communication device.

Example 10 includes the subject matter of any of Examples 1-9, and further including a contacts database having stored therein phone numbers of contacts of the user, and wherein to determine the phone number of the personal mobile communication device comprises to retrieve the phone number from the contacts database.

Example 11 includes the subject matter of any of Examples 1-10, and further including a display, and wherein to determine the phone number of the personal mobile communication device comprises to receive the phone number from the user via a user interface displayed on the display.

Example 12 includes the subject matter of any of Examples 1-11, and wherein to initiate the call comprises to append the phone number of the communal mobile communication device to the phone number of the personal mobile communication device.

Example 13 includes the subject matter of any of Examples 1-12, and wherein to initiate the call comprises to append the personal profile identification to the phone number of the communal mobile communication device and the phone number of the personal mobile communication device.

Example 14 includes the subject matter of any of Examples 1-13, and wherein to initiate the call comprises to generate an outgoing phone number comprising (i) the phone number of the personal mobile communication device, (ii) the phone number of the communal mobile communication device, and (iii) the personal profile identification.

Example 15 includes the subject matter of any of Examples 1-14, and wherein the outgoing call handler further to record call metrics of the call for the user of the communal mobile communication device.

Example 16 includes the subject matter of any of Examples 1-15, and further including an incoming call handler module to receive an incoming call including a personal profile identification identifying a call recipient to receive the call; determine a call treatment for the incoming call based on the personal profile identification; and announce the incoming call on the communal mobile communication device using the determined call treatment.

Example 17 includes the subject matter of any of Examples 1-16, and further including a personal profile database having stored therein personal profile identifications for user of the communal mobile communication device, and wherein to determine the call treatment for the incoming call comprises to retrieve call treatment data from the personal profile database based on the personal profile identification.

Example 18 includes the subject matter of any of Examples 1-17, and further including a personal profile database having stored therein personal profile identifications for user of the communal mobile communication device, and wherein to determine the call treatment comprises to apply a default call treatment in response to the personal profile identification for the user not existing in the personal profile database.

Example 19 includes the subject matter of any of Examples 1-18, and further including a display, wherein to determine the call treatment comprises to retrieve an image associated with the call recipient based on the personal profile identification, and wherein to announce the incoming call comprises to display the image on the display.

Example 20 includes the subject matter of any of Examples 1-19, and wherein to determine the call treatment comprises to retrieve a ringtone associated with the call recipient based on the personal profile identification, and to announce the incoming call comprises to play the ringtone on the communal mobile communication device.

Example 21 includes the subject matter of any of Examples 1-20, and wherein to announce the incoming call comprises to display identification data of a caller based on a phone number of a personal communication device that originated the incoming call.

Example 22 includes a method for handling a call based on user identification, the method comprising determining a personal profile identification for a user of a communal mobile communication device, the personal profile identification identifying the user from other users of the communal mobile communication device; determining, on the communal mobile communication device, a phone number of a personal mobile communication device of a call recipient selected to receive the call; and initiating the call from the communal mobile communication device to the personal mobile communication device using the phone number and the personal profile identification to identify the user.

Example 23 includes the subject matter of Example 22, and wherein determining the personal profile identification comprises presenting a menu of authorized users of the communal mobile communication device on a display of the communal mobile communication device; receiving a selection of one of the authorized users; and retrieving a personal profile identification of the selected authorized user from a personal profile database.

Example 24 includes the subject matter of any of Examples 22 and 23, and wherein retrieving a personal profile identification comprising authenticating the user to access the personal profile identification; and retrieving the personal profile identification from a personal profile database of the communal mobile communication device in response to authenticating the user.

Example 25 includes the subject matter of any of Examples 22-24, and wherein authenticating the user comprises receiving a passkey from the user via a user interface of the communal mobile communication device and authenticating the user based on the received passkey.

Example 26 includes the subject matter of any of Examples 22-25, and wherein determining the personal profile identification comprises authenticating the user to the communal mobile communication device; and retrieving, in response to authentication of the user, a personal profile identification from a personal profile database of the communal mobile communication device based on the authentication of the user.

Example 27 includes the subject matter of any of Examples 22-26, and wherein authenticating the user comprises determining whether a personal profile identification for the authenticated user exists in the personal profile database; and setting the personal profile identification to a default personal profile identification in response to the personal profile identification for the user not existing in the personal profile database.

Example 28 includes the subject matter of any of Examples 22-27, and wherein determining the personal profile identification comprises determining a numerical sequence that uniquely identifies the user from other authorized users of the communal mobile communication device.

Example 29 includes the subject matter of any of Examples 22-28, and wherein determining the personal profile identification comprises retrieving an e-mail address that uniquely identifies the user from other authorized users of the communal mobile communication device.

Example 30 includes the subject matter of any of Examples 22-29, and wherein determining the personal profile identification comprises retrieving a passkey that uniquely identifies the user from other authorized users of the communal mobile communication device.

Example 31 includes the subject matter of any of Examples 22-30, and wherein determining the phone number of the personal mobile communication device comprises retrieving the phone number from a contacts database.

Example 32 includes the subject matter of any of Examples 22-31, and wherein determining the phone number of the personal mobile communication device comprises receiving the phone number from the user via a user interface.

Example 33 includes the subject matter of any of Examples 22-32, and wherein initiating the call comprises appending the phone number of the communal mobile communication device to the phone number of the personal mobile communication device.

Example 34 includes the subject matter of any of Examples 22-33, and wherein initiating the call comprises appending the personal profile identification to the phone number of the communal mobile communication device and the phone number of the personal mobile communication device.

Example 35 includes the subject matter of any of Examples 22-34, and wherein initiating the call comprises gene-rating an outgoing phone number comprising (i) the phone number of the personal mobile communication device, (ii) the phone number of the communal mobile communication device, and (iii) the personal profile identification.

Example 36 includes the subject matter of any of Examples 22-35, and further including recording call metrics of the call for the user of the communal mobile communication device.

Example 37 includes the subject matter of any of Examples 22-36, and further including receiving an incoming call on the communal mobile communication device, the incoming call including a personal profile identification identifying a call recipient to receive the call; and determining a call treatment for the incoming call based on the personal profile identification; and announcing the incoming call on the communal mobile communication device using the determined call treatment.

Example 38 includes the subject matter of any of Examples 22-37, and wherein determining the call treatment for the incoming call comprises retrieving call treatment data from an incoming call policy database based on the personal profile identification.

Example 39 includes the subject matter of any of Examples 22-38, and wherein determining a call treatment comprises applying a default call treatment in response to the personal profile identification not existing in an incoming call policy database of the communal mobile communication device.

Example 40 includes the subject matter of any of Examples 22-39, and wherein determining the call treatment comprises retrieving an image associated with the call recipient based on the personal profile identification, and announcing the incoming call comprises displaying the image on a display of the communal mobile communication device.

Example 41 includes the subject matter of any of Examples 22-40, and wherein determining the call treatment comprises retrieving a ringtone associated with the call recipient based on the personal profile identification, and announcing the incoming call comprises playing the ringtone on the communal mobile communication device.

Example 42 includes the subject matter of any of Examples 22-41, and wherein announcing the incoming call comprises displaying identification data of a caller based on a phone number of a personal communication device that originated the incoming call.

Example 43 includes one or more machine readable storage media comprising a plurality of instructions stored thereon that in response to being executed result in a computing device performing the method of any of Examples 22-42.

Example 44 includes a communal mobile communication device for handling calls based on user identification, the communal mobile communication device comprising means for determining a personal profile identification for a user of a communal mobile communication device, the personal profile identification identifying the user from other users of the communal mobile communication device; means for determining, on the communal mobile communication device, a phone number of a personal mobile communication device of a call recipient selected to receive the call; and means for initiating the call from the communal mobile communication device to the personal mobile communication device using the phone number and the personal profile identification to identify the user.

Example 45 includes the subject matter of Example 44, and wherein the means for determining the personal profile identification comprises means for presenting a menu of authorized users of the communal mobile communication device on a display of the communal mobile communication device; means for receiving a selection of one of the authorized users; and means for retrieving a personal profile identification of the selected authorized user from a personal profile database.

Example 46 includes the subject matter of any of Examples 44 and 45, and wherein the means for retrieving a personal profile identification comprising means for authenticating the user to access the personal profile identification; and means for retrieving the personal profile identification from a personal profile database of the communal mobile communication device in response to authenticating the user.

Example 47 includes the subject matter of any of Examples 44-46, and wherein the means fear authenticating the user comprises means for receiving a passkey from the user via a user interface of the communal mobile communication device and authenticating the user based on the received passkey.

Example 48 includes the subject matter of any of Examples 44-47, and wherein the means for determining the personal profile identification comprises means for authenticating the user to the communal mobile communication device; and means for retrieving, in response to authentication of the user, a personal profile identification from a personal profile database of the communal mobile communication device based on the authentication of the user.

Example 49 includes the subject matter of any of Examples 44-48, and wherein the means for authenticating the user comprises means for determining whether a personal profile identification for the authenticated user exists in the personal profile database; and means for setting the personal profile identification to a default personal profile identification in response to the personal profile identification for the user not existing in the personal profile database.

Example 50 includes the subject matter of any of Examples 44-49, and wherein the personal profile identification comprises a numerical sequence that uniquely identifies the user from other authorized users of the communal mobile communication device.

Example 51 includes the subject matter of any of Examples 44-50, and wherein the personal profile identification comprises an e-mail address that uniquely identifies the user from other authorized users of the communal mobile communication device.

Example 52 includes the subject matter of any of Examples 44-51 and wherein the personal profile identification comprises a passkey that uniquely identifies the user from other authorized users of the communal mobile communication device.

Example 53 includes the subject matter of any of Examples 44-52, and wherein the means for determining the phone number of the personal mobile communication device comprises means for retrieving the phone number from a contacts database.

Example 54 includes the subject matter of any of Examples 44-53, and wherein the means for determining the phone number of the personal mobile communication device comprises means for receiving the phone number from the user via a user interface.

Example 55 includes the subject matter of any of Examples 44-54, and wherein the means for initiating the call comprises means for appending the phone number of the communal mobile communication device to the phone number of the personal mobile communication device.

Example 56 includes the subject matter of any of Examples 44-55, and wherein the means fear initiating the call comprises means for appending the personal profile identification to the phone number of the communal mobile communication device and the phone number of the personal mobile communication device.

Example 57 includes the subject matter of any of Examples 44-56, and wherein the means for initiating the call comprises means for generating an outgoing phone number comprising (i) the phone number of the personal mobile communication device, (ii) the phone number of the communal mobile communication device, and (id) the personal profile identification.

Example 58 includes the subject matter of any of Examples 44-57, and further including means for recording call metrics of the call for the user of the communal mobile communication device.

Example 59 includes the subject matter of any of Examples 44-58, and further including means for receiving an incoming call on the communal mobile communication device, the incoming call including a personal profile identification identifying a call recipient to receive the call; and means for determining a call treatment for the incoming call based on the personal profile identification; and means for announcing the incoming call on the communal mobile communication device using the determined call treatment.

Example 60 includes the subject matter of any of Examples 44-59, and wherein the means for determining the call treatment for the incoming call comprises means for retrieving call treatment data from a personal profile database based on the personal profile identification.

Example 61 includes the subject matter of any of Examples 44-60, and wherein the means for determining a call treatment comprises means for applying a default call treatment in response to the personal profile identification not existing in a personal profile database of the communal mobile communication device.

Example 62 includes the subject matter of any of Examples 44-61, and wherein the means for determining the call treatment comprises means for retrieving an image associated with the call recipient based on the personal profile identification, and the means for announcing the incoming call comprises means for displaying the image on a display of the communal mobile communication device.

Example 63 includes the subject matter of any of Examples 44-62, and wherein the means for determining the call treatment comprises means for retrieving a ringtone associated with the call recipient based on the personal profile identification, and the means for announcing the incoming call comprises means for playing the ringtone on the communal mobile communication device.

Example 64 includes the subject matter of any of Examples 44-63, and wherein the means for announcing the incoming call comprises means for displaying identification data of a caller based on a phone number of a personal communication device that originated the incoming call.

Example 65 includes a personal mobile communication device for handling a call based on user identification, the personal mobile communication device comprising a personal profile database having stored therein personal profile identifications that identify users of a communal mobile communication device; and an outgoing call handler module to (i) determine a call recipient of a communal mobile communication device to receive a call from a user of the personal mobile communication device, (ii) retrieve personal profile identification for the determined call recipient from the personal profile database and (ii) initiate the call to the communal mobile communication device using a phone number of the communal mobile communication device and the personal profile identification to identify the call recipient.

Example 66 includes the subject matter of Example 65, and wherein the personal profile identification comprises a numerical sequence that uniquely identifies the call recipient from other authorized users of the communal mobile communication device.

Example 67 includes the subject matter of any of Examples 65 and 66, and wherein the personal profile identification comprises an e-mail address that uniquely identifies the call recipient from other authorized users of the communal mobile communication device.

Example 68 includes the subject matter of any of Examples 65-67, and wherein the personal profile identification comprises a passkey that uniquely identifies the call recipient from other authorized users of the communal mobile communication device.

Example 69 includes the subject matter of any of Examples 65-68, and wherein to initiate the call comprises to append the phone number of the personal mobile communication device to the phone number of the communal mobile communication device.

Example 70 includes the subject matter of any of Examples 65-69, and wherein to initiate the call comprises to append the personal profile identification to the phone number of the personal mobile communication device and the phone number of the communal mobile communication device.

Example 71 includes the subject matter of any of Examples 65-70, and wherein to initiate the call comprises generate an outgoing phone number comprising (i) the phone number of the communal mobile communication device, (ii) the phone number of the personal mobile communication device, and (iii) the personal profile identification.

Example 72 includes the subject matter of any of Examples 65-71, and further including an incoming call handler module to receive an incoming call including a personal profile identification identifying a caller that initiated the incoming call determine a call treatment for the incoming call based on the personal profile identification; and announce the incoming call on the personal mobile communication device using the determined call treatment.

Example 73 includes the subject matter of any of Examples 65-72, and further including an incoming call policy database, and wherein to determine the call treatment for the incoming call comprises to retrieve call treatment data from the incoming call policy database based on the personal profile identification.

Example 74 includes the subject matter of any of Examples 65-73, and further including an incoming call policy database, and wherein to determine a call treatment comprises to apply a default call treatment in response to the personal profile identification not existing in the incoming call policy database.

Example 75 includes the subject matter of any of Examples 65-74, and further including a display, and wherein to determine the call treatment comprises to retrieve an image associated with the caller based on the personal profile identification, and to announce the incoming call comprises to display the image on the display.

Example 76 includes the subject matter of any of Examples 65-75, and wherein to determine the call treatment comprises retrieving a ringtone associated with the caller based on the personal profile identification, and to announce the incoming call comprises to play the ringtone on the personal mobile communication device.

Example 77 includes a method for handling a call based on user identification, the method comprising determining, on a personal mobile communication device, a call recipient of a communal mobile communication device to receive a call from a user of the personal mobile communication device; retrieving personal profile identification for the determined call recipient from a personal profile database of the personal mobile communication device, the personal profile identification identifying the call recipient from other users of the communal mobile communication device; and initiating the call from the personal mobile communication device to the communal mobile communication device using a phone number of the communal mobile communication device and the personal profile identification to identify the call recipient.

Example 78 includes the subject matter of Example 77, and wherein retrieving the personal profile identification comprises retrieving a numerical sequence from the personal profile database that uniquely identifies the call recipient from other authorized users of the communal mobile communication device.

Example 79 includes the subject matter of any of Examples 77 and 78, and wherein retrieving the personal profile identification comprises retrieving an e-mail address from the personal profile database that uniquely identifies the call recipient from other authorized users of the communal mobile communication device.

Example 80 includes the subject matter of any of Examples 77-79, and wherein retrieving the personal profile identification comprises retrieving a passkey from the personal profile database that uniquely identifies the call recipient from other authorized users of the communal mobile communication device.

Example 81 includes the subject matter of any of Examples 77-80, and wherein initiating the call comprises appending the phone number of the personal mobile communication device to the phone number of the communal mobile communication device.

Example 82 includes the subject matter of any of Examples 77-81, and wherein initiating the call comprises appending the personal profile identification to the phone number of the personal mobile communication device and the phone number of the communal mobile communication device.

Example 83 includes the subject matter of any of Examples 77-82, and wherein initiating the call comprises generating an outgoing phone number comprising (i) the phone number of the communal mobile communication device, (ii) the phone number of the personal mobile communication device, and (iii) the personal profile identification.

Example 84 includes the subject matter of any of Examples 77-83, and further including receiving an incoming call on the personal mobile communication device, the incoming call including a personal profile identification identifying a caller that initiated the incoming call determining a call treatment for the incoming call based on the personal profile identification; and announcing the incoming call on the personal mobile communication device using the determined call treatment.

Example 85 includes the subject matter of any of Examples 77-84, and wherein determining the call treatment for the incoming call comprises retrieving call treatment data from an incoming call policy database based on the personal profile identification.

Example 86 includes the subject matter of any of Examples 77-85, and wherein determining a call treatment comprises applying a default call treatment in response to the personal profile identification not existing in an incoming call policy database of the personal mobile communication device.

Example 87 includes the subject matter of any of Examples 77-86, and wherein determining the call treatment comprises retrieving an image associated with the caller based on the personal profile identification, and announcing the incoming call comprises displaying the image on a display of the personal mobile communication device.

Example 88 includes the subject matter of any of Examples 77-87, and wherein determining the call treatment comprises retrieving a ringtone associated with the caller based on the personal profile identification, and announcing the incoming call comprises playing the ringtone on the personal mobile communication device.

Example 89 includes one or more machine readable storage media comprising a plurality of instructions stored thereon that in response to being executed result in a computing device performing the method of any of Examples 77-88.

Example 90 includes a personal mobile communication device for handling a call based on user identification, the personal mobile communication device comprising means for determining a call recipient of a communal mobile communication device to receive a call from a user of the personal mobile communication device; means for retrieving personal profile identification for the determined call recipient from a personal profile database of the personal mobile communication device, the personal profile identification identifying the call recipient from other users of the communal mobile communication device; and means for initiating the call from the personal mobile communication device to the communal mobile communication device using a phone number of the communal mobile communication device and the personal profile identification to identify the call recipient.

Example 91 includes the subject matter of Example 90, and wherein the personal profile identification comprises a numerical sequence that uniquely identifies the call recipient from other authorized users of the communal mobile communication device.

Example 92 includes the subject matter of any of Example 90 and 91, and wherein the personal profile identification comprises an e-mail address that uniquely identifies the call recipient from other authorized users of the communal mobile communication device.

Example 93 includes the subject matter of any of Example 90-92, and wherein the personal profile identification comprises a passkey that uniquely identifies the call recipient from other authorized users of the communal mobile communication device.

Example 94 includes the subject matter of any of Example 90-93, and wherein the means for initiating the call comprises means for appending the phone number of the personal mobile communication device to the phone number of the communal mobile communication device.

Example 95 includes the subject matter of any of Example 90-94, and wherein the means for initiating the call comprises means for appending the personal profile identification to the phone number of the personal mobile communication device and the phone number of the communal mobile communication device.

Example 96 includes the subject matter of any of Example 90-95, and wherein the means for initiating the call comprises means for generating an outgoing phone number comprising (i) the phone number of the communal mobile communication device, (ii) the phone number of the personal mobile communication device, and (iii) the personal profile identification.

Example 97 includes the subject matter of any of Example 90-96, and further including means for receiving an incoming call on the personal mobile communication device, the incoming call including a personal profile identification identifying a caller that initiated the incoming call means for determining a call treatment for the incoming call based on the personal profile identification; and means for announcing the incoming call on the personal mobile communication device using the determined call treatment.

Example 98 includes the subject matter of any of Example 90-97, and wherein the means for determining the call treatment for the incoming call comprises means for retrieving call treatment data from an incoming call policy database based on the personal profile identification.

Example 99 includes the subject matter of any of Example 90-98, and wherein the means fear determining a call treatment comprises means for applying a default call treatment in response to the personal profile identification not existing in an incoming call policy database of the personal mobile communication device.

Example IOU includes the subject matter of any of Example 90-99, and wherein the means for determining the call treatment comprises means for retrieving an image associated with the caller based on the personal profile identification, and the means for announcing the incoming call comprises means for displaying the image on a display of the personal mobile communication device.

Example 101 includes the subject matter of any of Example 90-100, and wherein the means for determining the call treatment comprises means for retrieving a ringtone associated with the caller based on the personal profile identification, and the means for announcing the incoming call comprises means for playing the ringtone on the personal mobile communication device.

The invention claimed is:

1. A communal mobile communication device for handling calls based on user identification, the communal mobile communication device comprising:
   a memory;
   a processor;
   a data storage having stored therein a personal profile database including a plurality of personal profile identifications;
   an outgoing call handler module to (i) determine a personal profile identification from the plurality of personal profile identifications that identifies a user of the communal mobile communication device from other users, wherein the personal profile identification comprises information that uniquely identifies the user from other authorized users of the communal mobile communication device (ii) determine, based on the personal profile identification, a phone number of a personal mobile communication device of a call recipient selected to receive a call from the communal mobile communication device, and (iii) initiate the call from the communal mobile communication device and to the personal mobile communication device using the phone number and the personal profile identification to identify the user; and
   an incoming call handler module to receive a plurality of incoming calls, wherein each incoming call includes a corresponding personal profile identification that identifies a call recipient to receive the corresponding incoming call.

2. The communal mobile communication device of claim 1, wherein to determine the personal profile identification comprises to:
   authenticate the user to the communal mobile communication device; and
   retrieve, in response to authentication of the user, the personal profile identification from the personal profile database based on the authentication of the user.

3. The communal mobile communication device of claim 2, wherein to authenticate the user comprises to:
   determine whether the personal profile identification for the authenticated user exists in the personal profile database; and
   set the personal profile identification to a default personal profile identification in response to the determination that the personal profile identification for the user does not exist in the personal profile database.

4. The communal mobile communication device of claim 1, wherein the personal profile identification comprises at least one of (i) a numerical sequence that uniquely identifies the user from other authorized users of the communal mobile communication device, (ii) an e-mail address that uniquely identifies the user from other authorized users of the communal mobile communication device, or (iii) a passkey that uniquely identifies the user from other authorized users of the communal mobile communication device.

5. The communal mobile communication device of claim 1, wherein to initiate the call comprises to generate an outgoing phone number comprising (i) the phone number of the personal mobile communication device, (ii) the phone number of the communal mobile communication device, and (iii) the personal profile identification.

6. The communal mobile communication device of claim 1, wherein the outgoing call handler further to record call metrics of the call for the user of the communal mobile communication device.

7. The communal mobile communication device of claim 1, wherein the incoming call handler module is further to:
   determine a call treatment for a first incoming call of the plurality of incoming calls based on the corresponding personal profile identification included in the first incoming call; and
   announce the first incoming call on the communal mobile communication device using the determined call treatment.

8. The communal mobile communication device of claim 7, wherein to determine the call treatment for the first incoming call comprises to retrieve call treatment data from the personal profile database based on the corresponding personal profile identification.

9. The communal mobile communication device of claim 7, wherein:
   to determine the call treatment comprises to retrieve a ringtone associated with the call recipient based on the corresponding personal profile identification, and
   to announce the incoming call comprises to play the ringtone on the communal mobile communication device.

10. One or more non-transitory machine readable storage media comprising a plurality of instructions stored thereon that, in response to being executed, causes a communal mobile communication device to:
   determine a personal profile identification from a plurality of personal profile identifications stored in a personal profile database for a user of the communal mobile communication device, wherein the personal profile identification includes information that uniquely identifies the user from other authorized users of the communal mobile communication device;

determine, based on the personal profile identification, a phone number of a personal mobile communication device of a call recipient selected to receive the call;

initiate the call from the communal mobile communication device to the personal mobile communication device using the phone number and the personal profile identification to identify the user; and receive a plurality of incoming calls, wherein each incoming call includes a corresponding personal profile identification that identifies a call recipient to receive the corresponding incoming call.

11. The one or more non-transitory machine readable storage media of claim 10, wherein to determine the personal profile identification comprises to:

authenticate the user to the communal mobile communication device; and retrieve, in response to authentication of the user, the personal profile identification from the personal profile database of the communal mobile communication device based on the authentication of the user.

12. The one or more non-transitory machine readable storage media of claim 11, wherein to authenticate the user comprises to:

determine whether the personal profile identification for the authenticated user exists in the personal profile database; and set the personal profile identification to a default personal profile identification in response to the personal profile identification for the user not existing in the personal profile database.

13. The one or more non-transitory machine readable storage media of claim 10, wherein the personal profile identification comprises at least one of: (i) a numerical sequence that uniquely identifies the user from other authorized users of the communal mobile communication device, (ii) an e-mail address that uniquely identifies the user from other authorized users of the communal mobile communication device, or (iii) a passkey that uniquely identifies the user from other authorized users of the communal mobile communication device.

14. The one or more non-transitory machine readable storage media of claim 10, wherein to initiate the call comprises to generate an outgoing phone number comprising (i) the phone number of the personal mobile communication device, (ii) the phone number of the communal mobile communication device, and (iii) the personal profile identification.

15. The one or more non-transitory machine readable storage media of claim 10, wherein the plurality of instructions, in response to being executed, further cause the mobile communication device to record call metrics of the call for the user of the communal mobile communication device.

16. The one or more non-transitory machine readable storage media of claim 10, wherein the plurality of instructions, in response to being executed, further cause the mobile communication device to:

determine a call treatment for a first incoming call of the plurality of incoming calls based on the corresponding personal profile identification included in the first incoming call; and announce the first incoming call on the communal mobile communication device using the determined call treatment.

17. The one or more non-transitory machine readable storage media of claim 16, wherein to determine a call treatment comprises to apply a default call treatment in response to the corresponding personal profile identification not existing in an incoming call policy database of the communal mobile communication device.

18. A method for handling a call based on user identification, the method comprising:

determining a personal profile identification from a plurality of personal profile identifications stored in a personal profile database for a user of a communal mobile communication device, wherein the personal profile identification comprises information that uniquely identifies the user from other authorized users of the communal mobile communication device;

determining, on the communal mobile communication device and based on the personal profile identification, a phone number of a personal mobile communication device of a call recipient selected to receive the call;

initiating the call from the communal mobile communication device to the personal mobile communication device using the phone number and the personal profile identification to identify the user; and receiving a plurality of incoming calls, wherein each incoming call includes a corresponding personal profile identification that identifies a call recipient to receive the corresponding incoming call.

19. The method of claim 18, wherein determining the personal profile identification comprises:

authenticating the user to the communal mobile communication device; and retrieving, in response to authentication of the user, a personal profile identification from the personal profile database of the communal mobile communication device based on the authentication of the user.

20. The method of claim 19, wherein authenticating the user comprises:

determining whether a personal profile identification for the authenticated user exists in the personal profile database; and setting the personal profile identification to a default personal profile identification in response to the personal profile identification for the user not existing in the personal profile database.

21. The method of claim 18, wherein determining the personal profile identification comprises at least one of: (i) determining a numerical sequence that uniquely identifies the user from other authorized users of the communal mobile communication device, (ii) retrieving an e-mail address that uniquely identifies the user from other authorized users of the communal mobile communication device, or (iii) retrieving a passkey that uniquely identifies the user from other authorized users of the communal mobile communication device.

22. The method of claim 18, wherein initiating the call comprises generating an outgoing phone number comprising (i) the phone number of the personal mobile communication device, (ii) the phone number of the communal mobile communication device, and (iii) the personal profile identification.

23. The method of claim 18, further comprising recording call metrics of the call for the user of the communal mobile communication device.

24. The method of claim 18, further comprising:

determining a call treatment for a first incoming call of the plurality of incoming calls based on the corresponding personal profile identification included in the first incoming call; and announcing the first incoming call on the communal mobile communication device using the determined call treatment.

25. The method of claim 24, wherein determining a call treatment comprises applying a default call treatment in response to the corresponding personal profile identification not existing in an incoming call policy database of the communal mobile communication device.

\* \* \* \* \*